US011836390B2

(12) United States Patent
Chandrasekaran et al.

(10) Patent No.: US 11,836,390 B2
(45) Date of Patent: Dec. 5, 2023

(54) SMART STORAGE SERVICES DEVICE

(71) Applicant: Dell Products L.P., Round Rock, TX (US)

(72) Inventors: Balasubramanian Chandrasekaran, Austin, TX (US); Lucas Avery Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/488,705

(22) Filed: Sep. 29, 2021

(65) Prior Publication Data
US 2023/0102716 A1 Mar. 30, 2023

(51) Int. Cl.
*G06F 3/06* (2006.01)

(52) U.S. Cl.
CPC ............ *G06F 3/067* (2013.01); *G06F 3/0604* (2013.01); *G06F 3/0625* (2013.01); *G06F 3/0629* (2013.01)

(58) Field of Classification Search
None
See application file for complete search history.

(56) References Cited

U.S. PATENT DOCUMENTS

| | | | |
|---|---|---|---|
| 11,175,984 B1* | 11/2021 | Lercari | G06F 11/0784 |
| 11,451,455 B2* | 9/2022 | Ganguli | H04L 43/0852 |
| 2019/0114114 A1* | 4/2019 | Trika | H03M 13/3761 |
| 2020/0304566 A1* | 9/2020 | Xia | H04L 67/1014 |
| 2021/0232331 A1* | 7/2021 | Kannan | G06F 3/0631 |
| 2022/0171685 A1* | 6/2022 | Xiang | G06F 11/2064 |
| 2022/0222201 A1* | 7/2022 | Shveidel | H04L 67/1097 |
| 2022/0292221 A1* | 9/2022 | Sohail | G06F 21/6263 |

* cited by examiner

*Primary Examiner* — Edward J Dudek, Jr.
*Assistant Examiner* — Ralph A Verderamo, III
(74) *Attorney, Agent, or Firm* — Chamberlain, Hrdlicka, White, Williams, & Aughtry

(57) ABSTRACT

A storage services device includes: a first processor that provides first server services for a server having a second processor that is coupled to a second storage and that provides second server services of the server and a storage controller coupled to a first storage of the server that transmits information about the first storage to the first processor. The storage services device is disposed in the server and disaggregates, within the server, the first server services from the second server services.

14 Claims, 8 Drawing Sheets

SMART STORAGE SERVICES DEVICE

BACKGROUND

Servers may provide services to one or more clients having access to the servers. All services provided by a server may be disrupted (i.e., become unavailable to the clients) when an operation of the server is disrupted (e.g., loss of power to a server, a server is taken offline for maintenance purposes, etc.). However, users still wish to retain access to certain services of a server when the operation of the server has been disrupted.

SUMMARY

In general, certain embodiments described herein relate to a storage services device comprising a first processor that provides first server services for a server comprising a second processor coupled to a second storage, wherein the second processor provides second server services of the server and a storage controller coupled to a first storage of the server that transmits information about the first storage to the first processor. The storage services device is disposed in the server and disaggregates, within the server, the first server services from the second server services.

In general, certain embodiments described herein relate to a server comprising a first storage; a storage services device coupled to the first storage, wherein the storage services device comprises a first processor that provides first server services of the serve, a storage controller coupled to first storage and that transmits information about the first storage to the first processor; a second processor that provides second server services of the server; and a second storage coupled to the second processor. The storage services device disaggregates, within the server, the first server services from the second server services.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
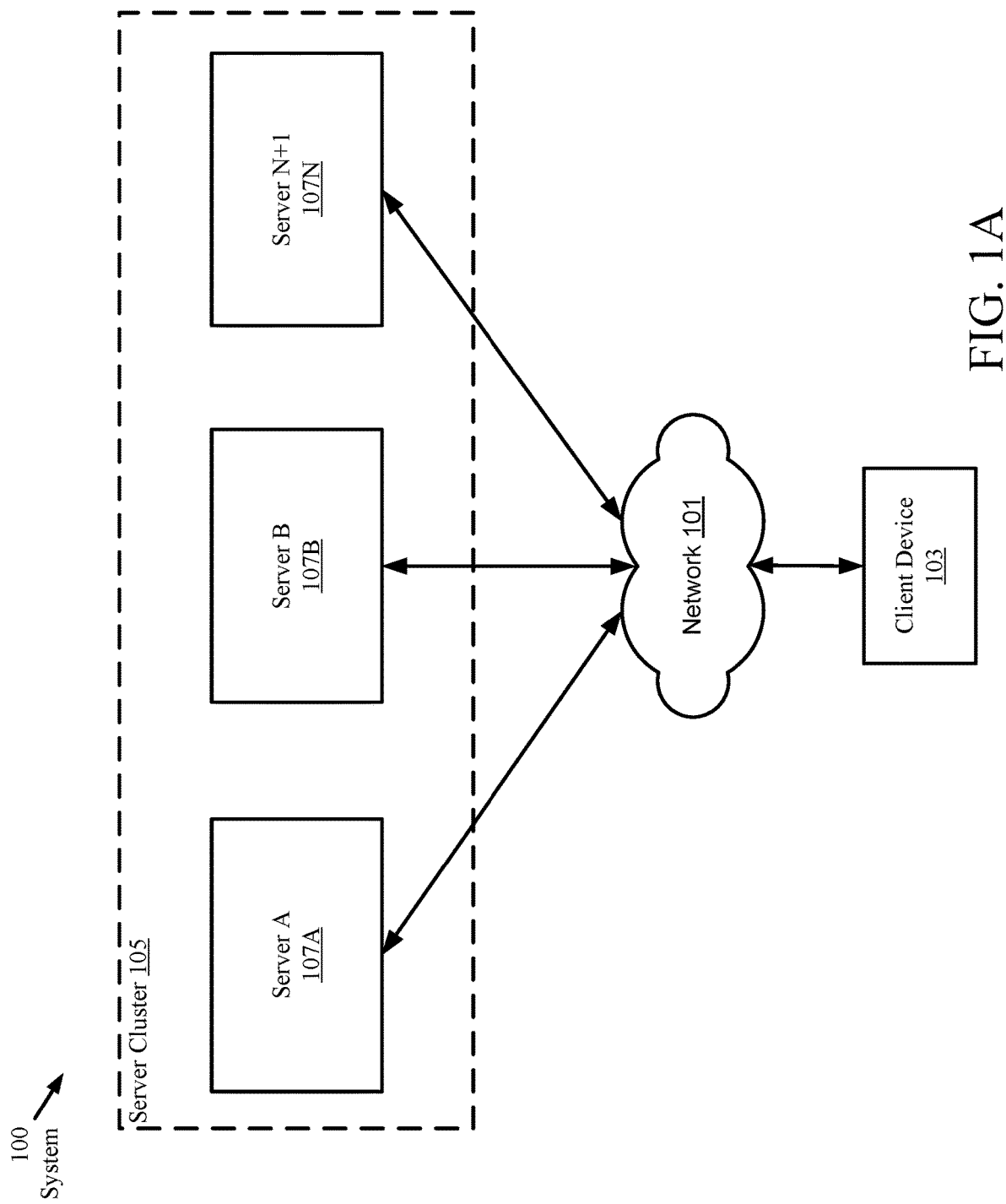
FIG. 1A shows a system in accordance with one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

One or more embodiments disclosed herein are directed to a storage services device that disaggregates server services provided by a server. In particular, in one or more embodiments, a server may be configured to provide one or more services such as storage services (herein also referred to as "first server services" and "server storage services") and compute services (herein also referred to as "second server services" and "server computing services"). Certain components of the server (e.g., storages) may be configured specifically for providing storage services to a client (e.g., through providing storage services to a client device used by the client). Additionally, two or more servers may work together to provide the storage services to the client. The storage services device of one or more embodiments is configured to disaggregate (i.e., isolate) such storage services from the computing services. This may advantageously provide clients (namely, computing devices of the clients with access to the server) access to the storage services while the computing services are offline and/or unavailable (e.g., while computing services have been suspended by an owner of the server).

The various embodiments discussed above are now described in more detail below.

FIG. 1A shows a system (100) in accordance with one or more embodiments. The system (100) includes a client device (103) connected to a server cluster (105) including one or more servers (107A, 107N) through a network (101). Each of these components of the system (100) will be described in more detail below.

In one or more embodiments disclosed herein, the network (101) may be a medium through which the client device (103) and the servers (107A, 107N) of the server cluster (105) are operatively connected. In one embodiment of the disclosure, the network may include other devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

In one or more embodiments disclosed herein, the client device (103) is a physical device or a virtual device (i.e., a virtual machine executing on one or more physical devices) such as a personal computing system (e.g., a laptop, a cell phone, a tablet computer, a virtual machine executing on a server, etc.) of a user (i.e., a customer of the provider of the server cluster (105)). For example, the client device (103) may be a computing system (e.g., 400, FIG. 4) as discussed below in more detail in FIG. 4.

In one or more embodiments, the system (100) may have multiple ones of the client device (103) (i.e., may have one or more client devices (103)). Each of the one or more client devices may be directly (or operatively, e.g., via the network (101)) connected to at least one of the server (107A, 107N) of the server cluster (105).

In one or more embodiments disclosed herein, a server (107A, 107N) may be a physical device, a group of physical devices, or a virtual device (discussed above) that provides functionalities (i.e., services) to other devices (e.g., the client device (103), another server (107A, 107N), etc.) connected (either directly or operatively through the network (101) to the server (107A, 107N). A single server (107A, 107N) may be connected to (i.e., serve) multiple ones of the client device (103). Additionally, a single client device (103) may be connected to (i.e., use the services provided by) multiple servers (107A, 107N).

Additional details of the server (107A, 107N) and the services provided by the server (107A, 107N) are discussed below in FIGS. 1B and 1C.

In one or more embodiments disclosed herein, the server cluster (105) includes a group of the servers (107A, 107N) working together as one system to provide other devices (e.g., the client device (103) with higher availability (e.g., higher quality of service, redundancy, higher performance, etc.) to the functionalities provided by each of the servers (107A, 107N) in the server cluster (105). For example, the server cluster (105) may be a rack of servers disposed in a datacenter. When access to a server (e.g., server (107A)) of the server cluster (105) becomes unavailable due to an outage event (e.g., server (107A) is taken offline by an administrator of the server cluster (105), the network (101) is unable to connect server (107A) to the client device (103), etc.), another server (e.g., server (107B)) of the server cluster (105) may take over services provided by server (107).

In one or more embodiments, the server cluster (105) may be configured as, but is not limited to, a virtual storage area network (Virtual SAN) (i.e., a software-defined storage (SDS) management architecture) environment and/or a hyperconverged infrastructure (HCI) environment comprising one or more HCIs (i.e., software-defined unified systems that combine all elements including storage, compute, networking, and management of a data center).

Figure 1B:
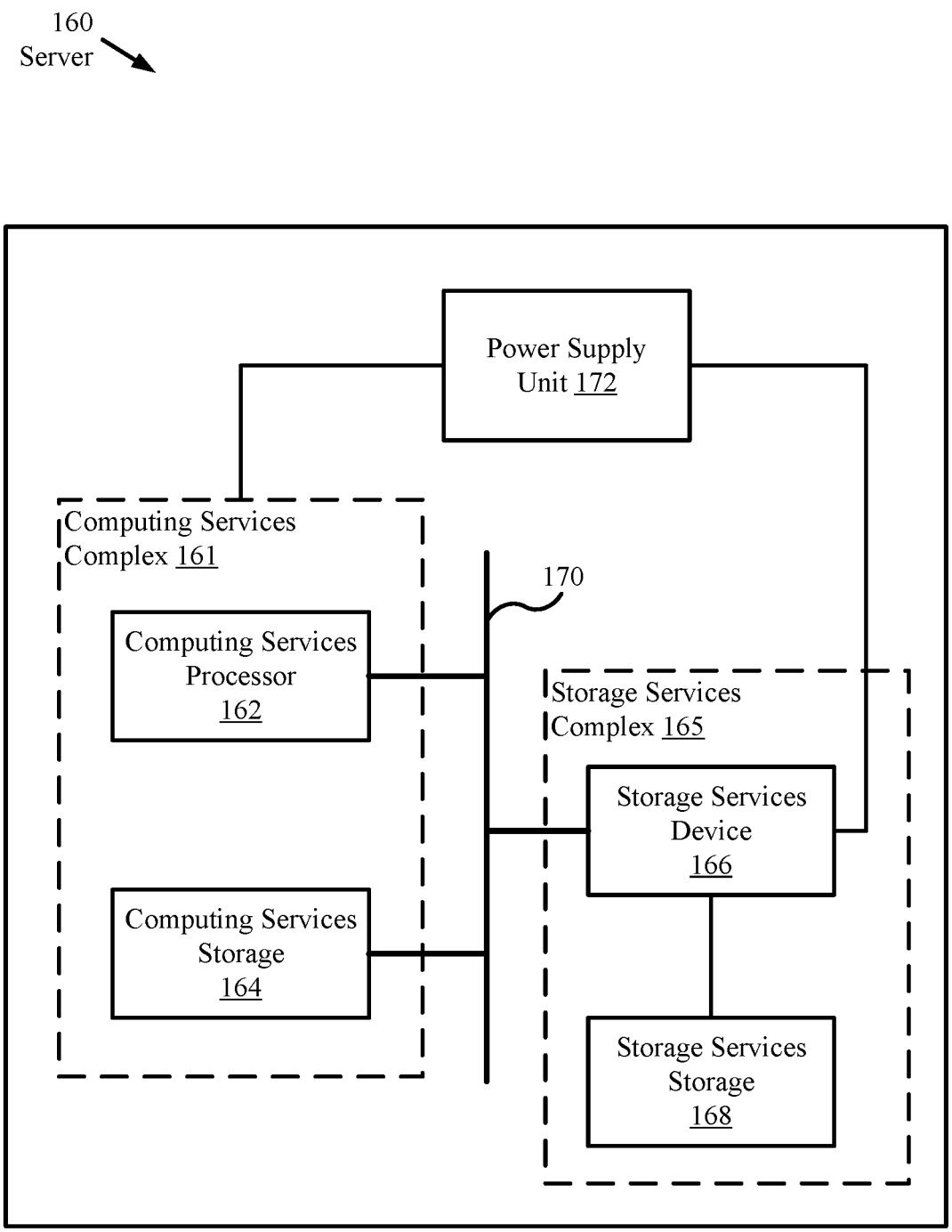
FIG. 1B shows a diagram of an example server in accordance with one or more embodiments.

Turning now to FIG. 1B, FIG. 1B shows an example server (160) in accordance with one or more embodiments of this disclosure. The server (160) may be the same as any of the servers (107A, 107N) described above in FIG. 1A. The server (160) may also be configured as a HCI as discussed above in FIG. 1A. In addition to the components discussed above in reference to FIG. 1A, the server (160) further includes: a computing services complex (161), a storage services complex (165), an interface (170), and a power supply unit (172). Each of the components illustrated in FIG. 1B is described below.

In one or more embodiments disclosed herein, the computing services complex (161) includes a computing services processor (162) and a computing services storage (164). The computing services processor (162) may be a computing resource that processes information (e.g., data) as requested by a component and sends the processed data to the requested entity (e.g., the client device (103) in FIG. 1A). Processing data may include arithmetic calculations, logic processing, and/or other input/output operations associated with the server computing services (discussed in more detail below) without departing from the invention. In one or more embodiments of the invention, the computing services processor (162) is implemented as a central processing unit (CPU) with single-core or multi-core processing capabilities. The computing services processor (162) may be other types of processors (or integrated circuits) without departing from the invention.

In one or more embodiments, the computing services storage (164) is implemented using devices that store data used for executing the server computing services. For example, the computing services storage (164) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage) for data required for executing one or more server computing services.

In one or more embodiments, using the combination of the computing services processor (162) and the computing services storage (164), the computing services complex (161) is configured to provide the server computing services of the server (160). The server computing services may include, but are not limited to: execute an operating system (OS) stored in the computing services storage (164); executing a hypervisor and virtual machines; executing services required for communication between other servers (107A, 107N) and the client device (103); etc.

In one or more embodiments disclosed herein, the storage services complex (165) includes a storage services device (166) that is connected to a storage services storage (168). The storage services device (166) is implemented using one or more components that provide data storage services (e.g., storing data and providing copies of previously stored data) for data that a client of the server (160) (or other servers among the one or more servers (107A, 107N)) wishes to store in the server (160) (i.e., client data).

In one or more embodiments disclosed herein, the storage services device (166) may be implemented using hardware, software, or any combination thereof. The storage services device (166), in combination with the storage services storage (168), is configured to provide the server storage services of the server (160). The server storage services may include, but are not limited to: providing access to data stored in the storage services storage (168) of the server for at least one of file system rebuilds, data coherence, data deduplication, and data compression; providing data access that is required for functioning of a Virtual SAN system; caching for faster access to stored data; providing data access to other servers so that those servers may also provide similar storage services to clients; encrypting and decrypting data; recording who or what is requesting the data for an audit; metering services (discussed in more detail below); etc.

Additional details with respect to the components of the storage services device is discussed below in FIG. 1C.

In one or more embodiments, the storage services storage (168) is implemented using devices that provide data storage services (e.g., storing data and providing copies of previously stored data). For example, the storage services storage (168) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

As shown in FIG. 1B, the computing services complex (161) is indirectly connected to the storage services storage (168) through the storage services devices (166). In other words, the computing services complex (161) accesses the server storage services (i.e., accesses client data stored in the storage services storage (168)) indirectly through the storage services device (166). This may advantageously result in the isolation of the server computing services from the server storage services (i.e., the disaggregation of the server computing services and the server storage services).

In one or more embodiments, the computing services complex (161) may also include a network interface (not shown in FIG. 1B). This network interface may be an integrated circuit for connecting the components of the computing services complex (161) to a network (e.g., 101, FIG. 1A) and/or to another device (directly or operatively through the network) such as, for example, another server and/or a client device (e.g., 101, FIG. 1A). In one or more embodiments, this network interface of the computing services complex (161) may be the main (i.e., primary) interface utilized by the server (160) to communicate with the network while the computing services complex (161) of the server (160) is in operation. Said another way, if the computing services complex (161) is active (e.g., if power is supplied to the computing services complex (161)), the server (160) will use this network interface of the computing services complex (161) as the primary interface for connecting to the network.

In one or more embodiments disclosed herein, the interface (170) is a physical component that connects each component of the computing services complex (161) and the storage services complex (165) in order for data to be communicated between each component. For example, the interface (170) may be, but is not limited to, a peripheral component interconnect express (PCIe) standard high-speed serial computer expansion bus.

In one or more embodiments disclosed herein, the power supply unit (172) is a physical component that provides power (i.e., electrical currents) to the server (160) (namely, the components within the server (160)) through converting power from a main alternating current (AC) power source (e.g., a wall outlet) to a low-voltage regulated direct current (DC) power. As shown in FIG. 1B, the of the computing services complex (161) and the storage services complex (165) includes a component that is separately connected to the power supply unit (172). This enables flexible regulation of power to each of the computing services complex (161) and the storage services complex (165). For example, supply of power can be stopped to the components of the computing services complex (161) while supply of power to the components of the storage services complex (165) is maintained (i.e., the while the storage services complex (165) portion of the server (160) remains operational).

Figure 1C:
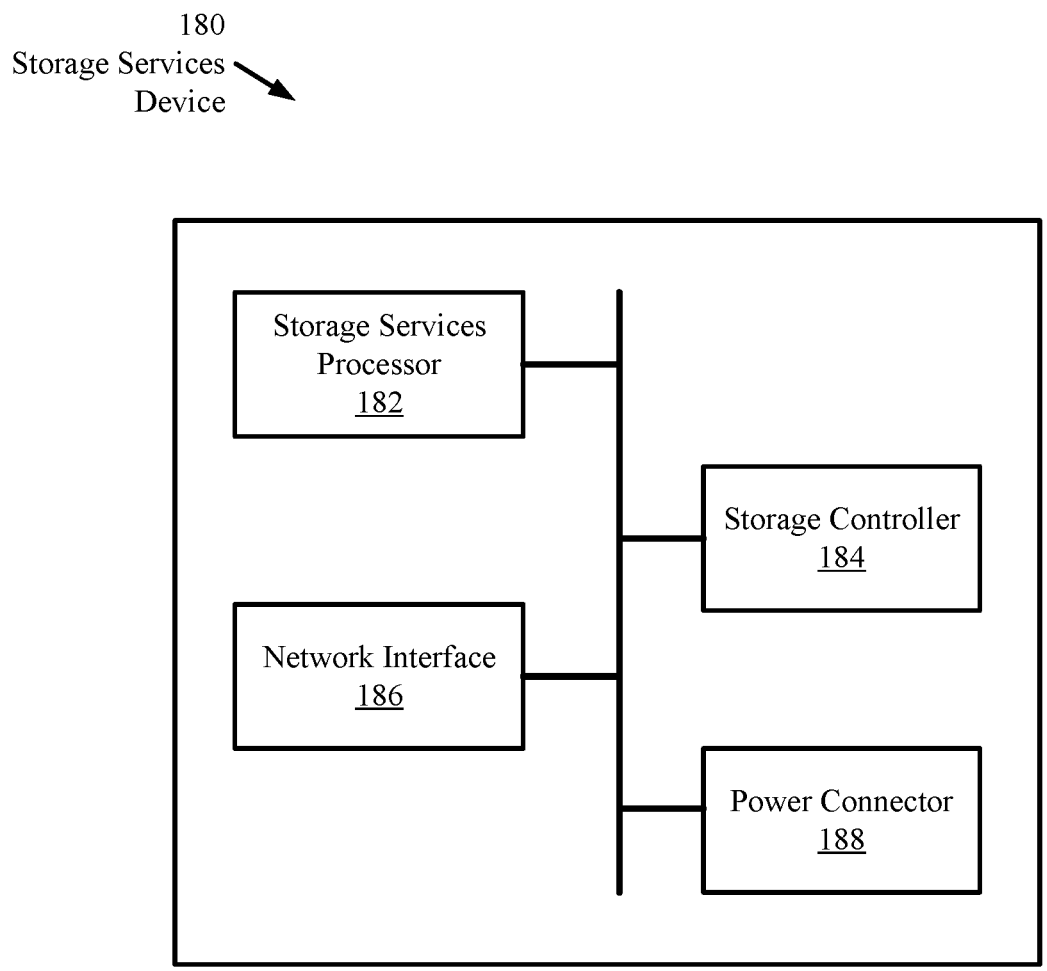
FIG. 1C shows a diagram of an example storage services device in accordance with one or more embodiments.

Turning now to FIG. 1C, FIG. 1C shows an example storage services device (180) in accordance with one or more embodiments of this disclosure. The storage services device (166) may be the same as the storage services device (180) described above in FIG. 1B. In addition to the components discussed above in reference to FIG. 1B, the storage services device (180) further includes: a storage services processor (182), a storage controller (184), a network interface (186), and a power connector (188). Each of the components illustrated in FIG. 1C is described below.

In one or more embodiments disclosed herein, the storage services processor (182) may be a computing resource that processes information (e.g., data) as requested by a component and sends the processed data to the requested entity (e.g., the client device (103) in FIG. 1A). Processing data may include arithmetic calculations, logic processing, and/or other input/output operations associated with the server storage services without departing from the invention. In one or more embodiments of the invention, the storage services processor (182) is implemented as a CPU with single-core or multi-core processing capabilities. The storage services processor (182) may be other types of processors (or integrated circuits) without departing from the invention.

In one or more embodiments, the storage services processor (182) is distinct and separate from the computing services processor (e.g., 162, FIG. 1B) of the computing services complex (e.g., 161, FIG. 1B). Said another way, each of the computing services complex and the storage services complex (e.g., 165, FIG. 1B) includes its own individual and independent CPU for processing data. This may also advantageously result in the isolation of the server computing services from the server storage services (i.e., the disaggregation of the server computing services and the server storage services).

In one or more embodiments disclosed herein, the storage controller (184) may be implemented using hardware, software, or any combination thereof. The storage controller (184) is configured to directly access the storage services storage (e.g., 168, FIG. 1B). For example, the storage controller (184) may be configured to store information into and to retrieve information from the storage services storage. The information retrieved from the storage services storage by the storage controller may be provided to the storage services processor (182), which is configured to use such information to meter and monitor the client data (or redundant copies of the client) stored in the storage services storage (i.e., meter and monitor the use of the storage services storage by a user of a client device).

In one or more embodiments, such metering and monitoring of the storage services storage by the storage services processor (182) may advantageously reduce a burden on the computing services processor (162). In particular, by offloading such metering and monitoring services to the storage services processor (182) (i.e., isolating the server computing services and server storage services into respective CPUs of the server), computing resources of the computing services processor (162) may be freed up to strictly execute the server computing services.

Additionally, in one or more embodiments, the storage services processor (182) may also meter and monitor the power and computing resource usages of the storage services complex. As a result, clients requiring only the server storage services of the server (160) may only be charged for the power and computing resource use of the storage services complex.

Furthermore, as discussed above, because the computing services complex and storage services complex are able to individually and independently process data (i.e., individually and independent process requests for services), the computing services complex portion of the server may be powered off in servers leased by clients that only require the server storage services (i.e., that do not require use of any of the components of the computing services complex). This may also advantageously enable such clients to not only reduce the server's power consumption but also allows the client to be charged for only power consumption required for executing the server storage services.

In one or more embodiments, the network interface (186) may be an integrated circuit for connecting the storage services device (180) to a network (e.g., 101, FIG. 1A) and/or to another device (directly or operatively through the network) such as, for example, another server and/or a client device (e.g., 101, FIG. 1A). For example, the network interface (186) may be configured to receive network traffic from the client device including instructions to store client data to (or retrieve client data from) the storage services storage. In one or more embodiments, the network interface (186) may advantageously enable the storage services device (180) to communicate directly with the client devices and/or other servers without the involvement of the network interface of the computing services complex (161).

In one or more embodiments disclosed herein, the power connector (188) may be any suitable cable (or wire(s)) (e.g., a power bus) for connecting the storage services device (180) to the power supply unit (e.g., 172, FIG. 1B) of the server (e.g., 160, FIG. 1B).

One skilled in the art will recognize that the architecture of the system (100), of the server (160) and of the storage services device (180) is not limited to the components shown in FIGS. 1A to 1C. For example, the system (100) may include any number of client devices (103). Further, the server (160) may include components (e.g., a graphical processing unit (GPU), a separate network interface coupled to or disposed on the computing services processor, etc.) not shown in FIG. 1B.

Additionally, although the above description describes the computing services processor (162) as configured to only execute server computing services and the storage services processor as configured to only execute server storage services, in one or more embodiments, each of these components may alternatively be configured to execute both types of services based on a requirement of a client accessing the services of the server (i.e., of a client leasing the server from a provider of the server).

Figure 2A:
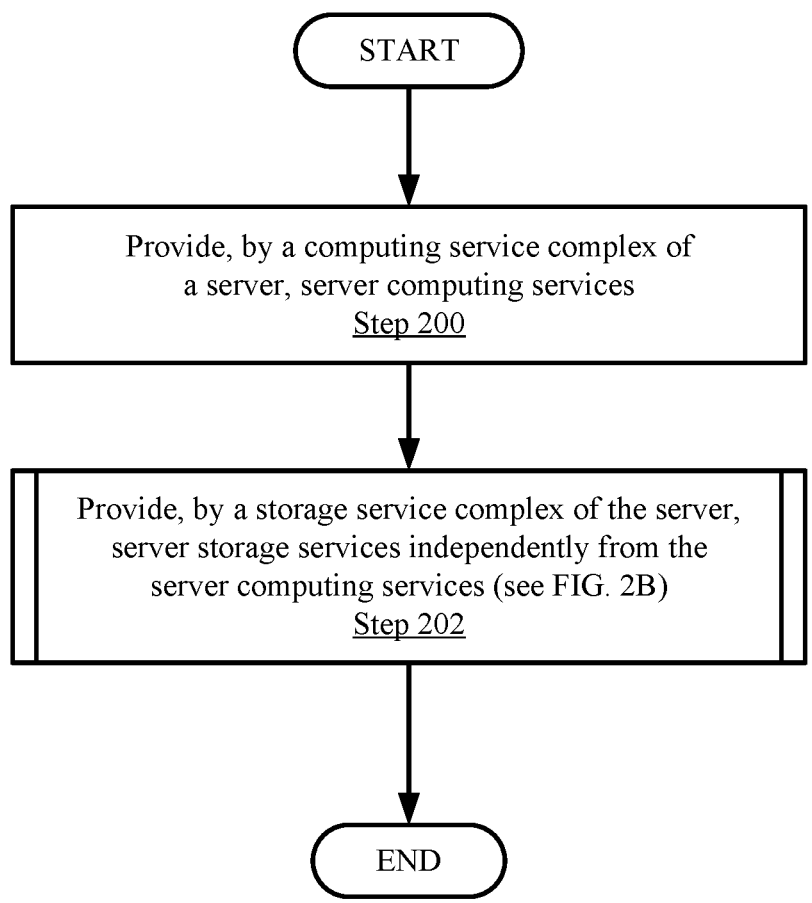
FIGS. 2A-2B show flowcharts of a disaggregated server services process in accordance with one or more embodiments.
Figure 2B:
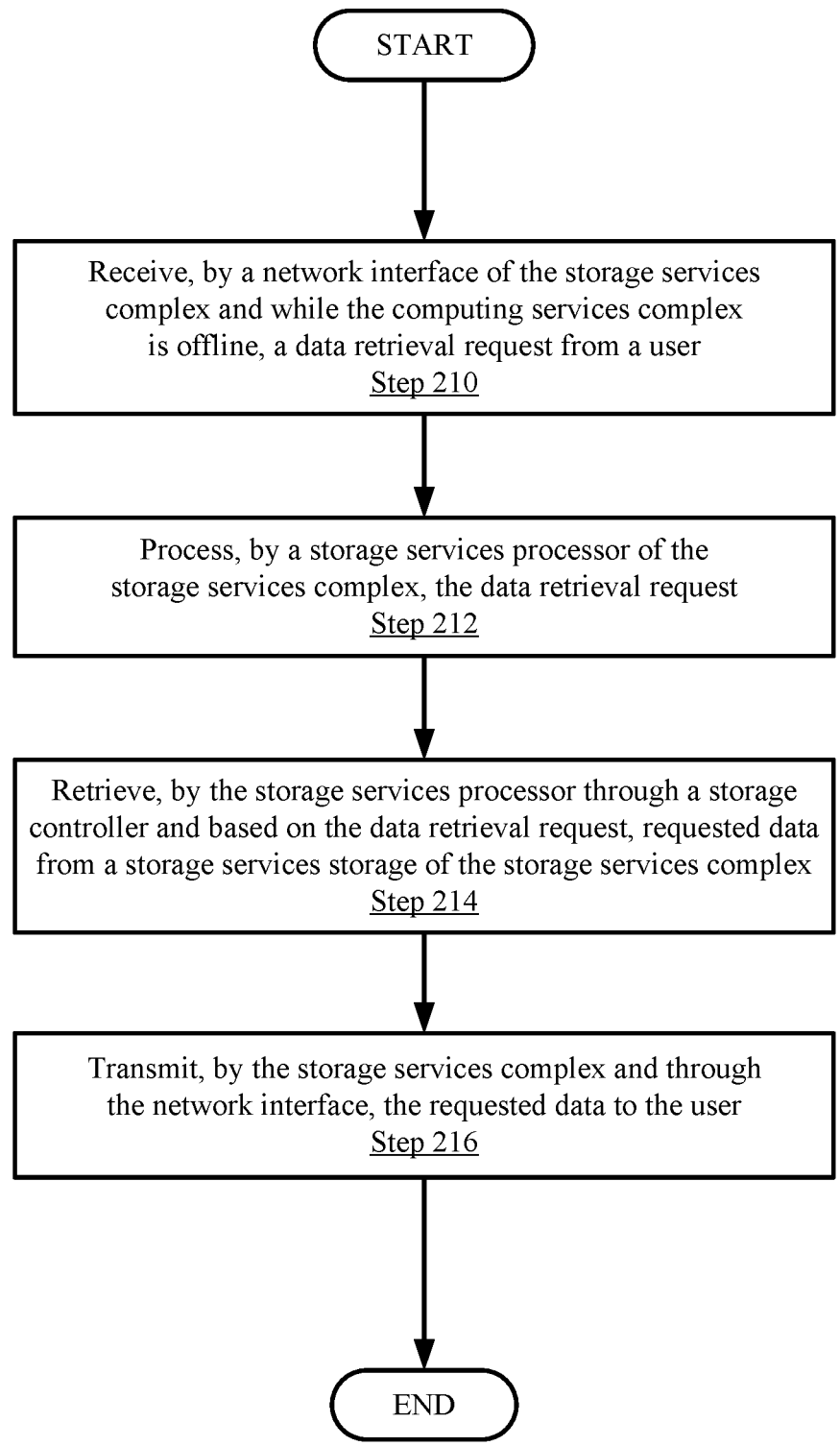

FIGS. 2A-2B show flowcharts of a method in accordance with one or more embodiments of the invention. The method depicted in FIGS. 2A-2B may be performed to execute a disaggregated server services process in accordance with one or more embodiments of the invention. The method shown in FIGS. 2A-2B may be performed by, for example, the server (e.g., 107A, 107N, FIG. 1A; 160, FIG. 1B).

While FIGS. 2A-2B are illustrated as a series of steps, any of the steps may be omitted, performed in a different order, additional steps may be included, and/or any or all of the steps may be performed in a parallel and/or partially overlapping manner without departing from the invention.

In Step 200 of FIG. 2A, a computing service complex (e.g., 161, FIG. 1B) of the server provides server computing services. For example, the computing services processor (e.g., 162, FIG. 1B) of the computing service complex may receive a request from a client device (e.g., 103, FIG. 1A). The request may include instructions to execute one or more computational processes (e.g., data simulation, advanced mathematical calculations, etc.) associated with server computing services provided by the computing services processor.

In Step 202, subsequently after or in parallel with Step 200, a storage service complex (e.g., 165, FIG. 1B) of the server provides (independently from the server computing services provided in Step 200), server storage services. For example, the storage services processor (e.g., 182, FIG. 1C) of the storage service complex may receive a request from the client device through a network interface (e.g., 186, FIG. 1C) of a storage services device (e.g., 180, FIG. 1C) of the storage service complex. The request may include instructions to execute one or more computational processes (e.g., data deduplication, data redundancy processes, etc.) associated with server storage services provided by the storage services processor. Additional details of Step 202 is discussed below in Steps 210-216 of FIG. 216.

Turning now to Step 210 of FIG. 2B, a data retrieval request from a user of the client device is received by the storage services complex through the network interface. In one or more embodiments, when the data retrieval request is retrieved, the computing services complex may be offline (e.g., in maintenance, is not supplied with power, turned off by an administrator of the server, etc.).

In one or more embodiments, as discussed above in FIG. 1A, the server may be one of many servers in a server cluster (e.g., 105, FIG. 1A) making up a HCI environment. The HCI environment may be configured to provide a data storage policy by storing multiple copies of original data stored in one server of the HCI environment across each of the other remaining servers of the HCI environment. The data storage policy may also include backups of the original data being created at predetermined intervals and stored to one or more servers of the HCI environment. In one or more embodiments, the data retrieval request from the user is associated with one of the backups created using the storage policy of the HCI environment. Without the disaggregation of the server computing services and the server storage services, if one of the servers of the HCI is taken offline during the executing of the data storage policy (i.e., when another server is attempting to save a backup of a data to the currently offline server), the data storage policy would be disrupted because the currently offline server is unable to provide the necessary server storage services to store the backup. As a result, after the currently offline server is brought back online, the server may no longer be compliant with the data storage policy of the HCI environment. Consequently, the disaggregation of the server computing services and the server storage services may advantageously allow servers within the HCI environment to maintain a data storage policy of the HCI environment by allowing server storage services to continue being available while server computing services become unavailable.

In Step 212, the data retrieval request is processed by the storage services processor of the storage services complex. In one or more embodiments, as part of the processing, the storage service processor retrieves (in Step 214 using a storage controller (e.g., 184, FIG. 1C) of the storage services device and from the storage services storage (e.g., 168, FIG. 1B)) the requested data associated with the data retrieval request.

In response to retrieving the requested data from the storage services storage, the requested data is transmitted (in Step 216) by the storage services complex using the network interface.

To further clarify embodiments of the invention, a non-limiting example is provided in FIGS. 3A-3B, and described below.

Beginning of Example

Figure 3A:
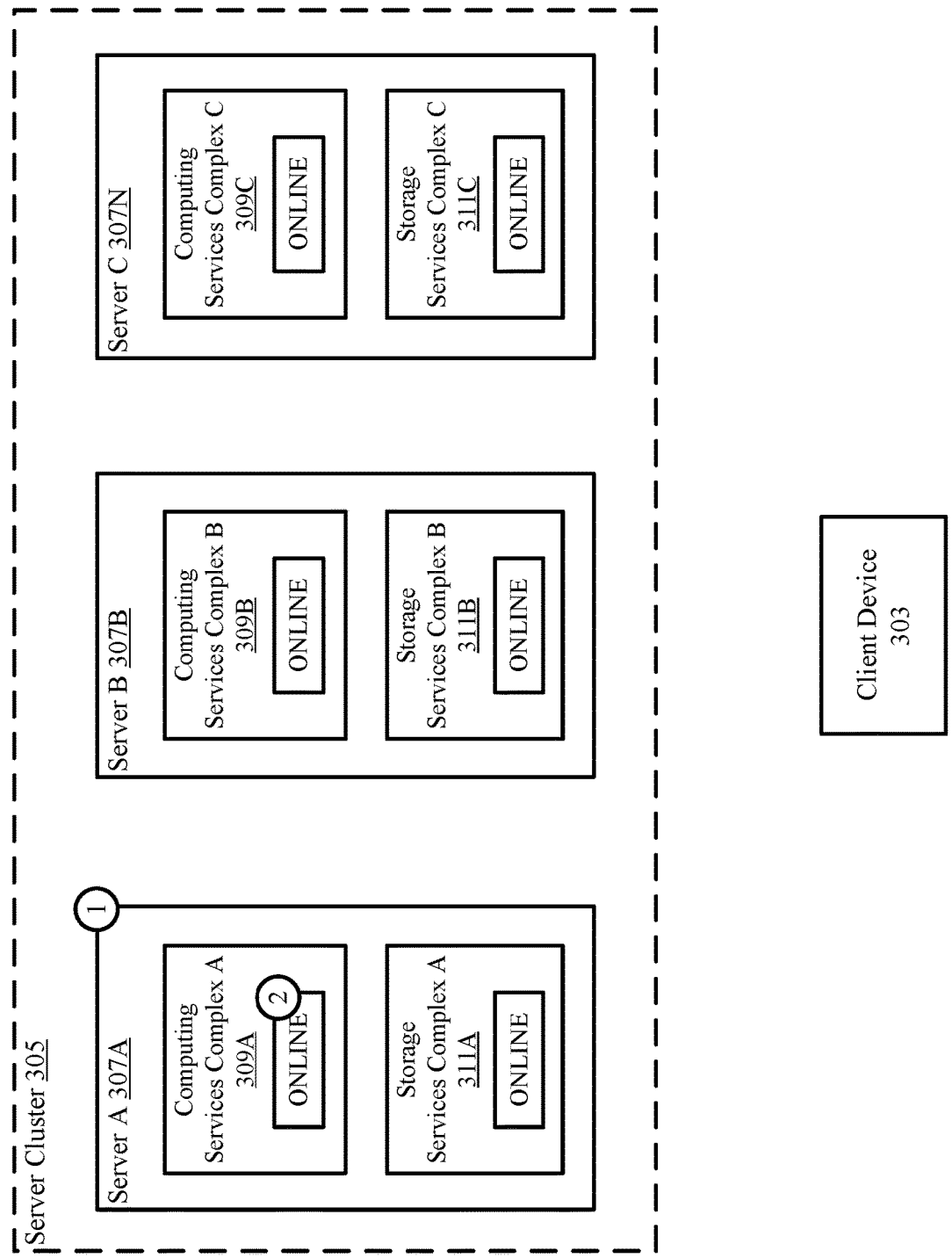
FIG. 3A-3B show an implementation example in accordance to one or more embodiments.

As shown in FIG. 3A, server A (307A) (e.g., 170A, 107N, FIG. 1) of server cluster (305) (e.g., 105, FIG. 1) receives instructions from an administrator to begin a scheduled maintenance and update of a firmware of server A (307A) [1]. In response, the computing services complex A (309A) (e.g., 161, FIG. 1B) starts the scheduled maintenance and update, and the server computing services are taken OFFLINE from a previously ONLINE status in response to the start of the scheduled maintenance and update; the storage services complex A (311A) (e.g., 165, FIG. 1B) remains ONLINE while the computing services complex A (309A) is taken OFFLINE [2].

Figure 3B:
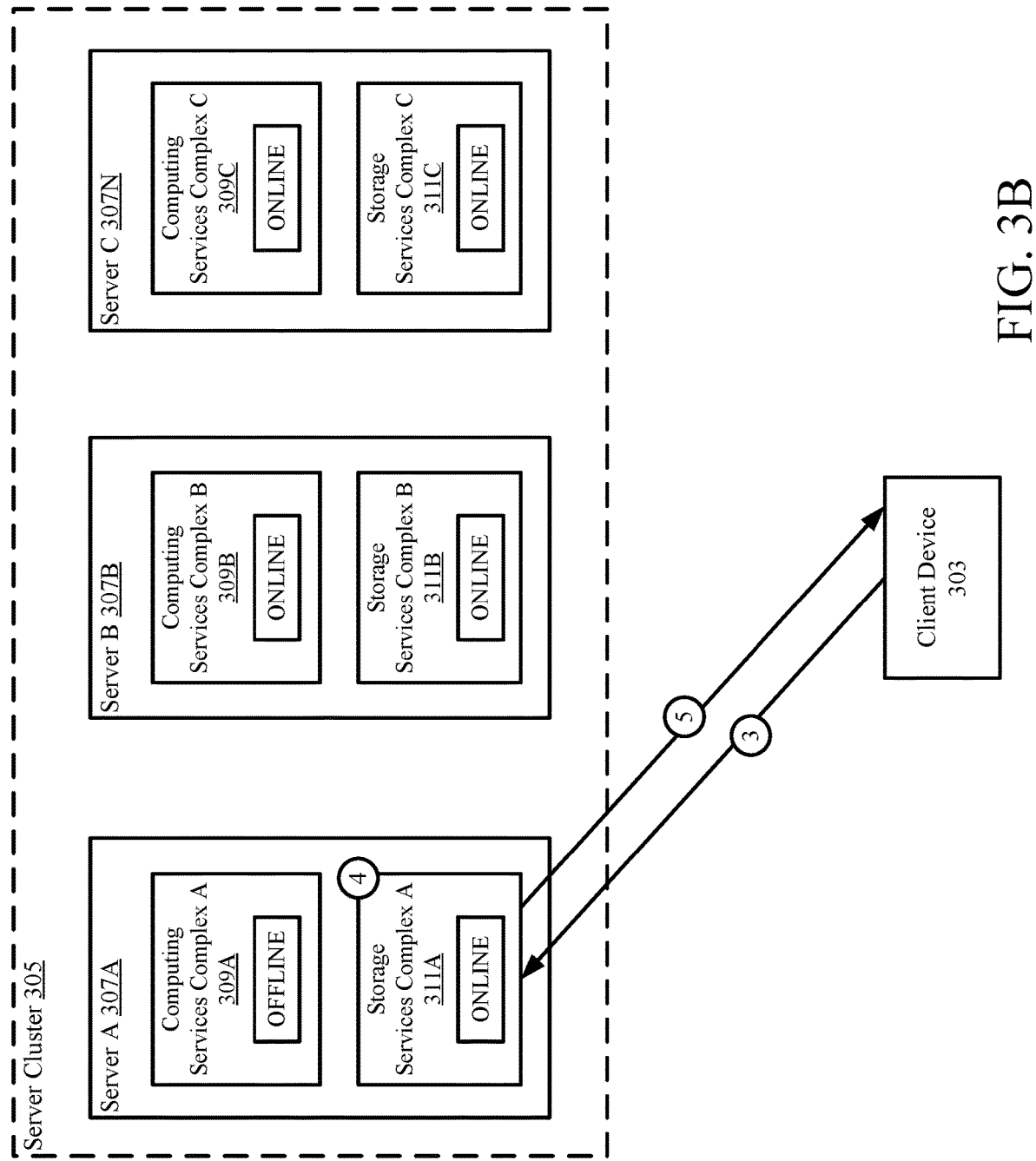

Turning now to FIG. 3B, while the computing services complex A (307A) is still OFFLINE from the execution of the maintenance and update, the storage services complex A (311A) receives a request from a client device (303) (e.g., 103, FIG. 1A) (or other servers of the server cluster (305)) to perform one or more server storage services [3]. In response to receiving the request, storage services complex A (311A) executes the server storage services [4]. Upon completion of the server storage services, storage services complex A (311A) transmits a notification to the client device (303) to notify the client device (303) of the completion of the requested server storage services.

End of Working Example

Figure 4:
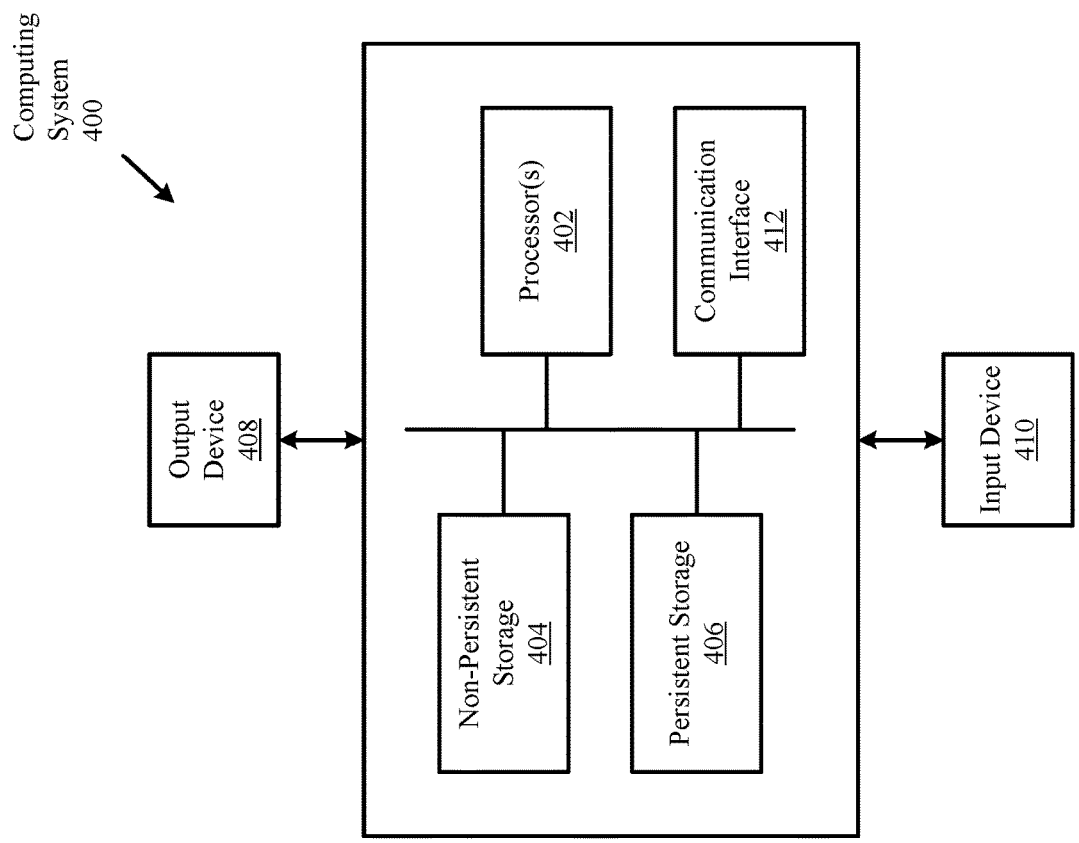
FIG. 4 shows a computing system in accordance with one or more embodiments.

FIG. 4 shows a computer system in accordance to one or more embodiments.

Embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a central processing unit (CPU). Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

The advantages discussed above throughout the detailed description should be understood as being examples associated with one or more problems being solved by embodiments of the invention. However, one or more embodiments of the invention disclosed herein should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A storage services device comprising:
   a first processor that provides first server services of a server,
      wherein the first processor meters and monitors power and computing resource usages of a storage services complex of the server in order to charge a user of the server that only needs the first server services,
      wherein the first processor further meters and monitors data stored in a storage services storage to reduce a burden on a second processor and to allow the second processor to only provide second server services of the server, wherein the second server services are server computing services of the server,
      wherein the first server services are server storage services of the server, wherein the server comprises the second processor coupled to a second storage,
      wherein the server storage services comprise providing data access to a virtual storage area network (SAN) system, providing data access to a second server and a third server, encrypting and decrypting data, and recording an identifier of the virtual SAN system for an audit;
   a storage controller, operatively coupled to a first storage of the server, that transmits information about the first storage to the first processor, wherein the storage services device is disposed in the server and generates a disaggregation, within the server, between the first server services and the second server services; and
   a power connector,
      wherein based on the disaggregation, the power connector independently connects the storage services device to a power supply unit of the server, wherein the power connector enables the storage services device to receive power while other components of the server are powered off such that the server continues to provide the first server services while the second server services are unavailable, wherein the server is part of a hyperconverged infrastructure (HCI) environment and a software-defined storage (SDS) management environment comprising the server and the second server, wherein the second server is configured as an HCI that combines at least a storage service, a compute service, a networking service, and a management service.

2. The storage services device of claim 1, wherein
the first processor is separate and distinct from the second processor, and
the first storage is separate and distinct from the second processor.

3. The storage services device of claim 2, wherein
the first processor provides only the server storage services.

4. The storage services device of claim 3, wherein
the server computing services comprise executing an operating system (OS) on the server, wherein the OS is stored in the second storage, and
the server storage services further comprise providing access to data stored in the first storage of the server for at least one of file system rebuilds, data coherence, data deduplication, and data compression.

5. The storage services device of claim 1, wherein, while the second server services are unavailable, the first server services are provided to a client device through a network interface on the storage services device.

6. The storage services device of claim 1, wherein the first processor monitors and meters data usage of data stored in the first storage using the information from the storage controller.

7. The storage services device of claim 1, wherein
the multiple ones of the server of the HCI environment store a same data as data stored in the first storage of the server to maintain a data storage policy of the HCI, and
the storage services device allows the server to continue to provide the first server services even when the server is being maintained or rebooted such that no disruption occurs to the data storage policy of the HCI.

8. A server comprising:
a first storage;
a storage services device coupled to the first storage, wherein the storage services device comprises:
a first processor that provides first server services of the server,
wherein the first processor meters and monitors power and computing resource usages of a storage services complex of the server in order to charge a user of the server that only needs the first server services,
wherein the first processor further meters and monitors data stored in a storage services storage to reduce a burden on a second processor and to allow the second processor to only provide second server services of the server, wherein the second server services are server computing services of the server,
wherein the first server services are server storage services of the server,
wherein the server storage services comprise providing data access to a virtual storage area network (SAN) system, providing data access to a second server and a third server, encrypting and decrypting data, and recording an identifier of the virtual SAN system for an audit;
a storage controller coupled to the first storage and that transmits information about the first storage to the first processor; and
a power connector,
wherein based on a disaggregation between the first server services and the second server services, the power connector independently connects the storage services device to a power supply unit of the server,
wherein the power connector enables the storage services device to receive power while other components of the server are powered off such that the server continues to provide the first server services while the second server services are unavailable,
wherein the server is part of a hyperconverged infrastructure (HCI) environment and a software-defined storage (SDS) management environment comprising the server and the second server, wherein the second server is configured as an HCI that combines at least a storage service, a compute service, a networking service, and a management service; and
a second storage coupled to the second processor,
wherein the storage services device is disposed in the server and generates the disaggregation, within the server, between the first server services and the second server services.

9. The server of claim 8, wherein
the first processor is separate and distinct from the second processor, and
the first storage is separate and distinct from the second processor.

10. The server of claim 9, wherein
the first processor provides only the server storage services.

11. The server of claim 10, wherein
the server computing services comprise executing an operating system (OS) on the server, wherein the OS is stored in the second storage, and
the server storage services further comprise providing access to data stored in the first storage of the server for at least one of file system rebuilds, data coherence, data deduplication, and data compression.

12. The server of claim 8, wherein, while the second server services are unavailable, the first server services are provided to a client device through a network interface on the storage services device.

13. The server of claim 8, the first processor monitors and meters data usage of data stored in the first storage using the information from the storage controller.

14. The storage services device of claim 8, wherein
the multiple ones of the server of the HCI store a same data as data stored in the first storage of the server to maintain a data storage policy of the HCI, and
the storage services device allows the server to continue to provide the first server services even when the server is being maintained or rebooted such that no disruption occurs to the data storage policy of the HCI.

* * * * *